Patented Feb. 11, 1930

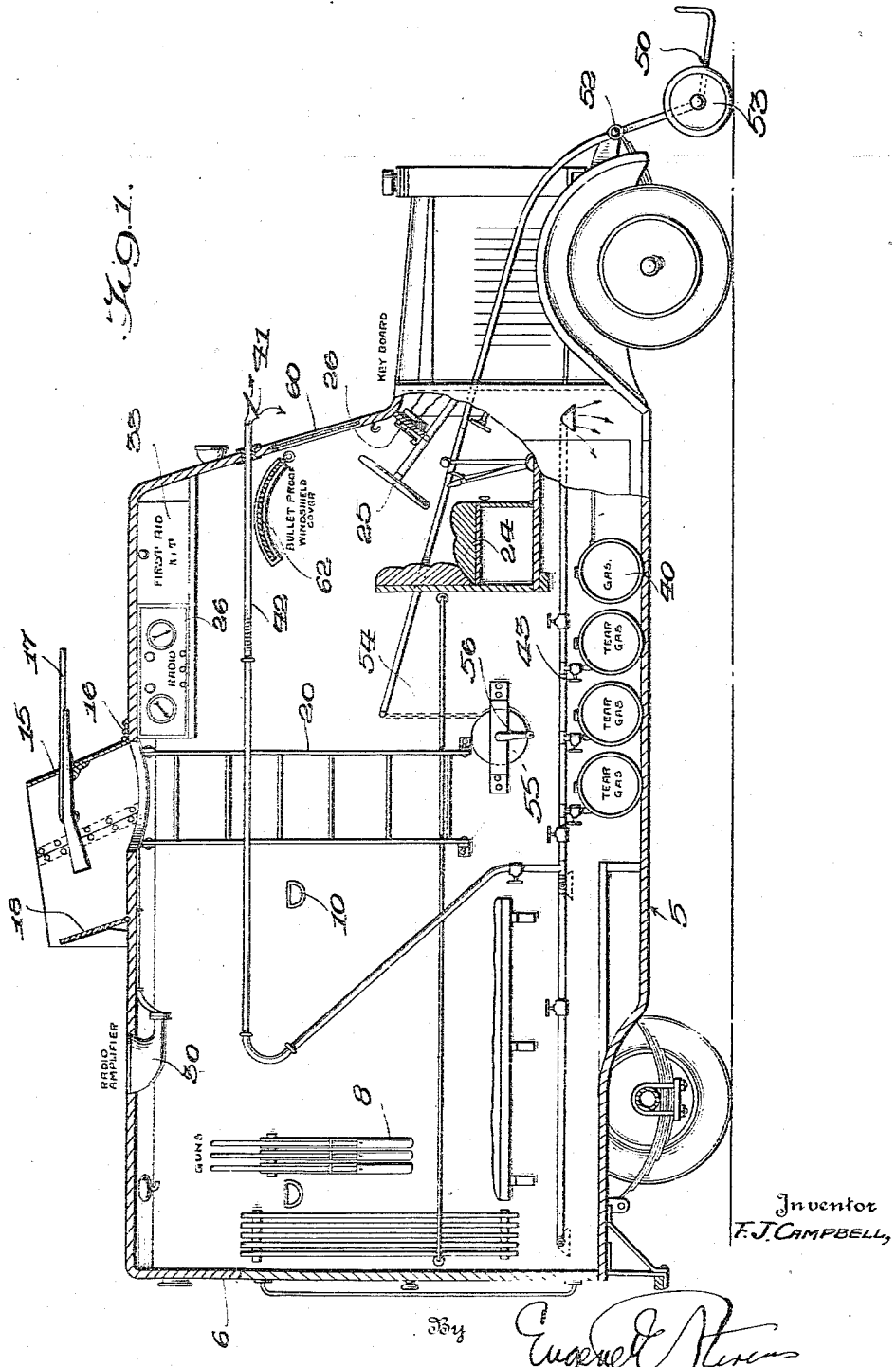

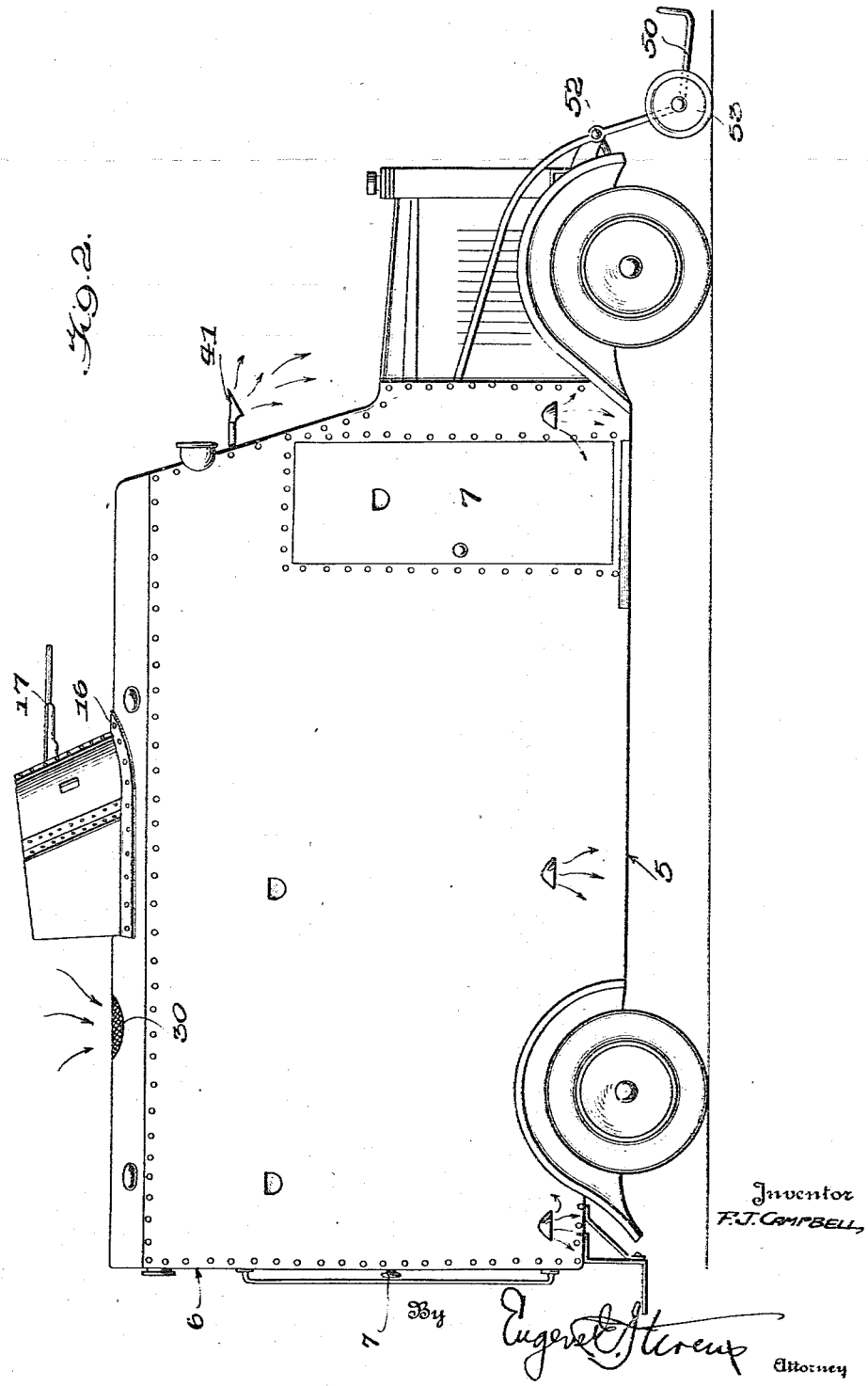

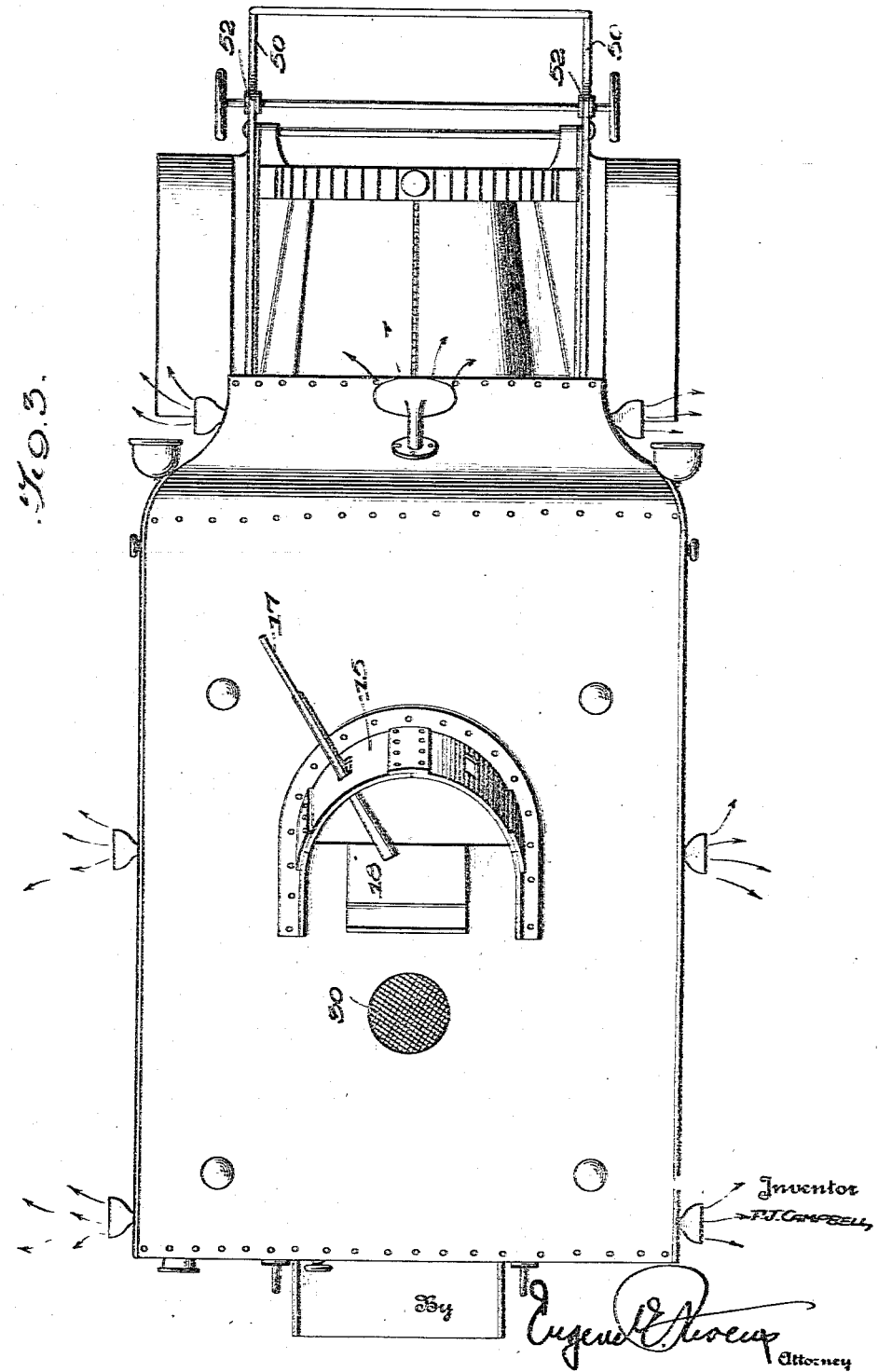

1,747,142

UNITED STATES PATENT OFFICE

FREDERICK J. CAMPBELL, OF PORT HURON, MICHIGAN

ARMORED MOTOR VEHICLE

Application filed August 18, 1926. Serial No. 129,937.

This invention relates to motor vehicles especially adapted for use in warfare, riots and in the extermination of insects and other pests.

One of the features of the invention resides in the means by which the occupant of the motor vehicle may be effectively protected against bullets and various missiles such as bottles, rocks, sticks, bricks which might be thrown by attackers.

A further and equally important object of the invention is to provide an armored car having successful offensive means and in the arrangement of the offensive means by which a foe such as an enemy of war, those engaged in rioting, those engaged in rum running and other lawless activities may be effectively subdued.

A further aim is to provide an armored car of the pursuit type equipped with mechanism by which the rear wheels of a fleeing car may be lifted off the ground and the car thereby brought to a halt.

Another aim of the invention is to provide novel means whereby those within the armored car may communicate with the outside world either through the medium of the radio or a trumpet.

Other objects and advantages will be apparent during the course of the following description.

In the accompanying drawing forming a part of this application and in which like numerals are employed to designate like parts throughout the same, Figure 1 is a sectional view through the improved armored car;

Figure 2 is a side elevation of the same;

Figure 3 is a plan view of the invention.

In the drawing wherein for the purpose of illustration is shown a preferred embodiment of the invention, the numeral 5 generally designates a motor vehicle having an armored body 6 provided with sides, ends and a top of a suitably stout metal. The metal forming the body 6 should be of a gauge sufficiently thick to withstand the bullets, rocks, bricks, sticks and the like to protect the occupants of the vehicle.

In carrying out the invention the body 6 may be provided with doors 7 at the sides and rear thereof and by means of which access to and egress from the body is made possible.

Referring now to Figure 1, it will be seen that a plurality of rifles 8 may be carried in the body. The occupants of the car may in case of necessity stick the guns through the peep holes 10 at various places in the body and doors of the motor vehicles. In addition to providing a means by which the rifle may be projected through the body for firing the peep holes 10 permit the occupant to see what is going on in the outside world. Figure 1 illustrates that a gun shield 15 is mounted on the top of the body and is hinged as indicated at 16 so that the various sections of the same may be collapsed. A rifle, a machine gun, or the like, may be carried by the shield and will form both an offensive and defensive means in warfare, in combating riots and so forth. The operator of the gun 17 may be seated upon the top of the body and his back supported by a rest 18. All of this superstructure may be enclosed within the body when not needed. The operator of the pill box as it has come to be known since the war may ascend the ladder 20 to enter the pill box and may, of course, descend into the body by way of the ladder.

The vehicle operator's seat 24 may if desired be adjustable for comfort and is, of course, mounted rearwardly of a steering wheel 25. A telegraph key board 26 is mounted on the dash within convenient reach of the operator and permits of the sending of wireless messages with the aid of a radio 26.

Communication with the outside world is made possible by the radio 26 by which messages may be sent and received. A radio amplifier 30 may extend out through the top of the body or a trumpet may be employed for the use of those within the body who desire to communicate directly with those in the immediate vicinity of the car.

In carrying out the invention, a first aid kit 33 may be positioned within the body and may be provided with those articles usually found necessary in an emergency.

A number of tanks 40 may be positioned within the body and may carry tear gas, mustard gas, liquid fire, or other destructive fluids and may be expelled through nozzles 41 having connection with the tanks through the medium of pipes 42. Valves 43 may be employed to control the discharge of the destructive fluid. The nozzles 41 may project out from the car at various places and separate valves provide a means whereby the discharge of the destructive fluid through the various nozzles may be controlled.

A pick-up device consisting of a plurality of hooked arms 50 fulcrumed as indicated at 52 is positioned at the front of the vehicle and provides a means whereby the rear wheels of a fleeing automobile may be lifted off the ground. The terminals of the arms or levers 50 are hooked upwardly to hold the arms in engagement with the axle housing of an automobile and if desired ground contact wheels 53 may be connected to the arms in advance of the fulcrum point 52 thereof.

Figure 1 illustrates that the major portions of the arms 50 are extended rearwardly of the fulcrumed point and have connection with one or more chains 54 trained about a reel 55, one end of which has a crank 56. When the arms 50 have been engaged with an axle housing or positioned beneath an axle housing it is merely necessary to turn the crank 56 around so that the wheels of the fleeing automobile are lifted off the ground and further travel of the vehicle under its own power prevented. This idea is also capable of expression in connection with wrecking automobiles or more specifically, those commercial cars which are especially equipped to aid wrecked automobiles.

The windshield 60 may be in the nature of safety glass and the operator may be further protected by bringing a flexible shield 62 directly in back of the windshield. Suitable guides or brackets may be employed to support the flexible shield 62.

With reference to the foregoing description taken in connection with the accompanying drawings it will be seen that a motor vehicle constructed in accordance with this invention is capable of both offensive and defensive use and in either case the occupants of the vehicle will be adequately protected.

In carrying out the invention novel means may be provided by which the automobile may be converted almost instantly from a pleasure car to one of combat and to do this it is merely necessary to provide a special hood about the car and employ means by which the hood may be removed in a period of not more than 15 seconds.

Having thus described the invention, what is claimed is:

1. An armored vehicle comprising a chassis having an armored body mounted thereon, a foldable turret surmounting said body, a lifting device pivoted to the front of the chassis, and a winding drum mounted interiorly of said body and connected with said lifting device for operating the same.

2. An armored vehicle comprising a chassis having an armored body mounted thereon, a foldable turret surmounting said body, a wheeled lifting device pivoted to the front of the chassis, a winding drum mounted interiorly of said body and connected with said lifting device for operating the same, and radio communication establishing means in said vehicle.

In testimony whereof I affix my signature.

FREDERICK J. CAMPBELL.